Dec. 15 1925.
C. H. HALT
1,565,999
TRACTOR HITCH
Filed May 26, 1924
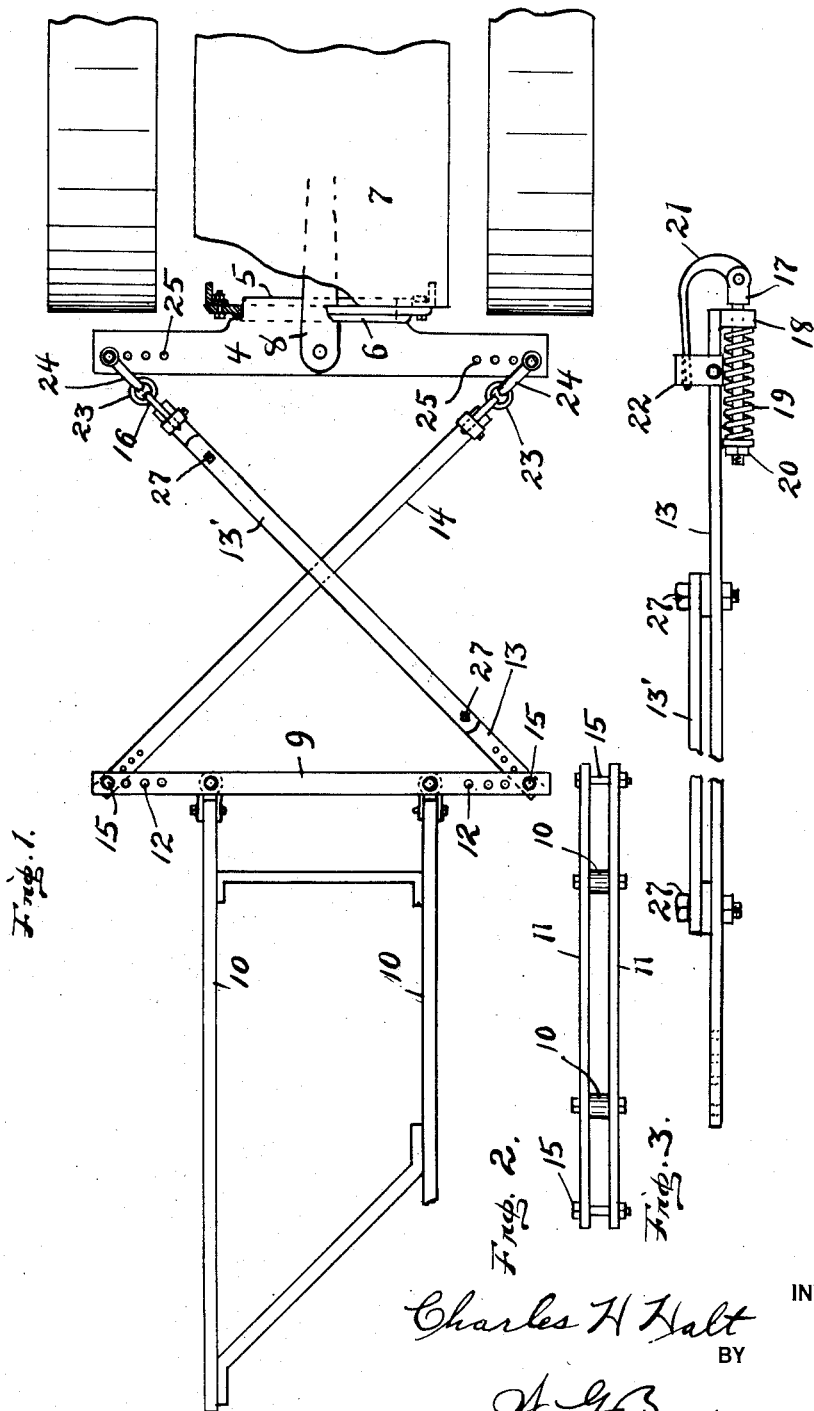
INVENTOR
Charles H Halt
BY
A. G. Burns  ATTORNEY Patented Dec. 15, 1925.

1,565,999

UNITED STATES PATENT OFFICE.

CHARLES H. HALT, OF OSSIAN, INDIANA, ASSIGNOR OF ONE-FOURTH TO CHARLES A. HOFFMANN, OF FORT WAYNE, INDIANA, AND SIXTY ONE-HUNDREDTHS TO EMBRA W. KINSEY, OF CLAYPOOL, INDIANA, AND HORRY KINSEY, OF NORTH MANCHESTER, INDIANA.

TRACTOR HITCH.

Application filed May 26, 1924. Serial No. 715.788.

*To all whom it may concern:*

Be it known that I, CHARLES H. HALT, a citizen of the United States of America, and resident of Ossian, in the county of Wells and State of Indiana, have invented certain new and useful Improvements in Tractor Hitches, of which the following is a specification.

This invention relates to improvements in tractor hitches for use in coupling together a plow or other implement and the tractor by which it is drawn, and the object of the improvement is to afford a construction by means of which the plow will be so drawn as to effect a sharp turn in its course as at the corners thereof. Usually, when a tractor is employed for drawing a plow and an abrupt turn is made by the tractor, the plow tends to change its course in the direction of the changed course of the tractor prematurely so that the furrows at the corners of the field are rounded instead of angular. The present invention contemplates the correction of that tendency of the plow to "cut the corners" when its course is changed.

These objects are accomplished by the construction illustrated in the accompanying drawings, in which:—

Fig. 1 is a fragmentary plan view of a tractor and plow and in which is included a hitch embodying the invention;

Fig. 2 is a front elevation of one of the transverse beams forming the plow connection; and Fig. 3 is a side view of one of the cross bars including a safety coupling in connection therewith.

The characters appearing in the description refer to parts shown in the drawings and designated thereon by corresponding characters.

The invention comprises a cross beam 4 having a central projection 5 at its front edge that is positioned in the tail bracket 6 of the tractor 7 and which is bolted to the draw-bar 8 thereon so that the beam is rigidly held in connection with the tractor.

A second beam 9 is rigidly mounted upon the front ends of the parallel plow beams 10 so as to be held fixedly in transverse position thereon. The beam 9 is formed of a pair of parallel bars 11 spaced apart for the reception of the plow beams therebetween, and the bars each have adjacent each end thereof a series of bolt holes 12. The beams 9 and 4 are coupled together by means of two independent cross bars 13 and 14, the bars being connected respectively with the corresponding opposite ends of said beams. Each of the cross-bars is secured to the beam 9 by means of a bolt 15 and has at its opposite end a safety coupling 16 for connection with the beam 4. The safety coupling consists of a bolt 17 that extends loosely through a bracket 18 on the end of the cross-bar, there being a compression spring 19 and a nut 20 on the bolt to hold it in normal position. Upon the outer end of the bolt is hinged a latch 21, the extending end of which projects into a stirrup 22 that is longitudinally adjustable on the cross-bar. The latch is hooked loosely through a link 23 that is connected with a shackle 24 on the beam 4. The shackles 24 are each adjustably secured to the beam 4, there being a series of holes 25 made in the beam for securing the shackle at corresponding points thereon.

One of the cross-bars 13 has thereon a guide bar 13' parallel therewith and spaced apart therefrom, and the other cross-bar 14 extends loosely between the guide and the former cross-bar.

In the operation of the invention, when the course of the tractor is straight the plow is drawn in a corresponding straight course in the path of the tractor with the cross-bars under equal tension, However, when the course of the tractor is changed, as toward the right hand, the plow is drawn by the cross-bar 13, which tends to pull the plow in the direction opposite to the course of the tractor with the result that the straight course of the plow is protracted. In this manner the driver is enabled to make abrupt turns which is particularly advantageous in plowing the corners of a field.

By adjustably lengthening or shortening the connections of the cross-bars with the beams, the alinement of the plow with the tractor may be shifted to the right or left accordingly, and by adjustably positioning the shackles 24 on the beam that tendency of the cross-bars to draw the plow in the direction oppositely to the turning of the tractor may be modified so as to be more or less pronounced.

In the event the plow is drawn into an unyielding obstruction the springs 19 yield as the bolts 17 are drawn forward, and the latches 21 are drawn from their stirrup which permits the latches to become detached from the rings, and thus the plow is uncoupled from the tractor without becoming damaged.

What I claim is:—

1. In combination with the tractor and a plow, a transverse beam rigidly fixed on the tractor at the rear end thereof; a second transverse beam rigidly fixed on the plow beam at the front end thereof, both of said transverse beams having adjacent each of their ends a series of spaced bolt holes; and a pair of cross-bars oppositely positioned, each having means at its ends for connection selectively in the corresponding series of bolt holes in said beams, so that either the connections between the forward ends of the cross-arms with the tractor beam, or the connections at the rear end of the cross-bars with said beam on the plow may be spaced at relatively greater or lesser distances apart.

2. In combination with a tractor and a plow, a beam rigidly fixed on the tractor at the rear thereof, transversely disposed; a shackle pivotally secured at each end of said beam, there being means for adjustment of said shackle on said beam laterally respecting the tractor; a second beam rigidly fixed on the plow at the front thereof transversely disposed, each end of said second beam having therein a series of spaced bolt holes disposed laterally respecting the plow; a pair of cross-bars, the rear end of each bar having therein a series of spaced bolt holes disposed longitudinally respecting the bar; a coupling bolt for connecting the rear end of each cross-bar to the corresponding end of said second beam engageable selectively in the bolt holes thereof; and a connection between the forward end of each cross-bar, including a loose link, and the corresponding shackle.

3. In combination with a tractor including a transverse beam at the rear end thereof, and a plow including a transverse beam at the front end thereof; and a pair of cross-bars each having a pivotal connection at its rear end with the corresponding end of the beam on said plow, there being means for the lateral adjustment of said pivotal connections, the forward end of each cross-bar having a connection adjustably coupled to the beam of the tractor at the corresponding end thereof, each connection including a loose link.

In testimony whereof I affix my signature.

CHARLES H. HALT.